US011477676B2

(12) United States Patent
Mondal et al.

(10) Patent No.: US 11,477,676 B2
(45) Date of Patent: Oct. 18, 2022

(54) RLM ENHANCEMENTS FOR 5G NETWORKS

(71) Applicant: Apple Inc., Cupertino, CA (US)

(72) Inventors: Bishwarup Mondal, San Ramon, CA (US); Lopamudra Kundu, Sunnyvale, CA (US); Seau S. Lim, Swindon SWD (GB); Dae Won Lee, Portland, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/289,013

(22) PCT Filed: Oct. 29, 2019

(86) PCT No.: PCT/US2019/058557
§ 371 (c)(1),
(2) Date: Apr. 27, 2021

(87) PCT Pub. No.: WO2020/092363
PCT Pub. Date: May 7, 2020

(65) Prior Publication Data
US 2022/0007217 A1    Jan. 6, 2022

Related U.S. Application Data

(60) Provisional application No. 62/755,346, filed on Nov. 2, 2018.

(51) Int. Cl.
*H04W 24/08*    (2009.01)
*H04L 5/00*    (2006.01)
(Continued)

(52) U.S. Cl.
CPC ......... *H04W 24/08* (2013.01); *H04J 11/0069* (2013.01); *H04L 1/203* (2013.01);
(Continued)

(58) Field of Classification Search
CPC ......... H04W 76/0816; H04W 74/0825; H04W 74/0808; H04W 74/08; H04W 76/18;
(Continued)

(56) References Cited

U.S. PATENT DOCUMENTS

2018/0249526 A1    8/2018 Nagaraja et al.
2019/0052377 A1*   2/2019 Hwang ................. H04L 5/0035
(Continued)

FOREIGN PATENT DOCUMENTS

WO    2018143776 A1    8/2018

OTHER PUBLICATIONS

Huawei et al., "CR for Remaining Issues in RLM", 3GPP TSG-WG4, Meeting #88bis, R4-1812991, Oct. 2018, Chengdu, China, 10 pgs.
(Continued)

*Primary Examiner* — Phong La
(74) *Attorney, Agent, or Firm* — Kowert, Hood, Munyon, Rankin & Goetzel, P.C.

(57) ABSTRACT

An apparatus of user equipment (UE) includes processing circuitry coup led to a memory, where to configure the UE for radio link monitoring (RLM) in a New Radio-Unlicensed (NR-U) network, the processing circuitry is to decode radio resource control (RRC) signaling from a base station. The RRC signaling includes configuration information to configure transmission occasions for a plurality of RLM reference signals (RLM-RSs). A primary synchronization signal (PSS) or a secondary synchronization signal (SSS) detection is performed to determine a number of RLM-RSs of the plurality of RLM-RSs that are successfully transmitted during the transmission occasions. Signal measurements are performed on the RLM-RSs that are successfully transmitted within an evaluation duration to determine a block error rate (BLER). The signal measurements are performed when the
(Continued)

number is higher than a threshold number. An in-sync (IS) indicator or an out-of-sync (OOS) indicator are generated based on the signal measurements.

20 Claims, 8 Drawing Sheets

(51) Int. Cl.
*H04J 11/00* (2006.01)
*H04W 76/18* (2018.01)
*H04L 1/20* (2006.01)
*H04W 74/08* (2009.01)

(52) U.S. Cl.
CPC ....... *H04L 5/0051* (2013.01); *H04W 74/0816* (2013.01); *H04W 76/18* (2018.02)

(58) Field of Classification Search
CPC ..... H04W 76/12; H04W 76/11; H04W 76/10; H04W 24/08; H04W 24/10; H04W 24/06; H04W 24/04; H04W 24/02; H04L 25/0226; H04L 27/2613; H04L 27/2655; H04L 1/203; H04L 1/206; H04L 1/208; H04L 1/201; H04L 1/20; H04L 5/0051; H04L 5/005; H04L 5/0048

See application file for complete search history.

(56) References Cited

U.S. PATENT DOCUMENTS

| | | | |
|---|---|---|---|
| 2019/0058519 A1* | 2/2019 | Davydov | H04L 67/10 |
| 2019/0357292 A1* | 11/2019 | Cirik | H04W 24/08 |
| 2019/0380052 A1* | 12/2019 | Yang | H04L 5/001 |
| 2020/0274657 A1* | 8/2020 | Deenoo | H04W 76/27 |
| 2020/0336973 A1* | 10/2020 | Niu | H04W 72/1289 |
| 2020/0351055 A1* | 11/2020 | Manolakos | H04W 56/001 |
| 2021/0099899 A1* | 4/2021 | Wu | H04W 24/08 |
| 2021/0185694 A1* | 6/2021 | Hua | H04W 72/085 |
| 2021/0344433 A1* | 11/2021 | Li | H04B 17/373 |
| 2022/0007217 A1* | 1/2022 | Mondal | H04L 5/0048 |
| 2022/0061116 A1* | 2/2022 | Lim | H04L 5/0048 |

OTHER PUBLICATIONS

Interdigital Inc., "RLM/RLF for NR-U", 3GPP RAN WG2, Meeting #103bis, R2-1814011, Oct. 2018, Chengdu, China, 4 pgs.

LG Electronics, "Initial Access and Mobility for NR Unlicensed Operation", 3GPP TSG-RAN WG1, Meeting #94bis, R1-1810270, Oct. 2018, Chengdu, China, 14 pgs.

International Search Report and Written Opinion for International Application No. PCT/US2019/058557, dated Feb. 19, 2020, 7 pgs.

* cited by examiner

RLM ENHANCEMENTS FOR 5G NETWORKS

PRIORITY CLAIM

This application is a U.S. National Stage filing of International Application No. PCT/US2019/058557, filed Oct. 29, 2019, entitled "RLM ENHANCEMENTS FOR 5G NETWORKS", which claims the benefit of priority to the U.S. Provisional Patent Application Ser. No. 62/755,346, filed Nov. 2, 2018, and entitled "RADIO LINK MONITORING (RLM) ENHANCEMENT FOR NEW RADIO," each of which is incorporated herein by reference in its entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, and fifth-generation (5G) networks including 5G new radio (NR) (or 5G-NR) networks, 5G-LTE networks, and 5G NR unlicensed spectrum (NR-U) networks. Other aspects are directed to systems and methods for RLM enhancements for 5G networks including NR-U networks.

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in a number of disparate environments. Fifth-generation (5G) wireless systems are forthcoming and are expected to enable even greater speed, connectivity, and usability. Next generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in unlicensed spectrum without requiring an "anchor" in the licensed spectrum, called MulteFire. MulteFire combines the performance benefits of LTE technology with the simplicity of Wi-Fi-like deployments.

Further enhanced operation of LTE systems in the licensed as well as unlicensed spectrum is expected in future releases and 5G systems. Such enhanced operations can include techniques for SR enhancements for 5G networks including NR-U networks.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in or substituted for, those of other aspects. Aspects set forth in the claims encompass all available equivalents of those claims.

Figure 1A:
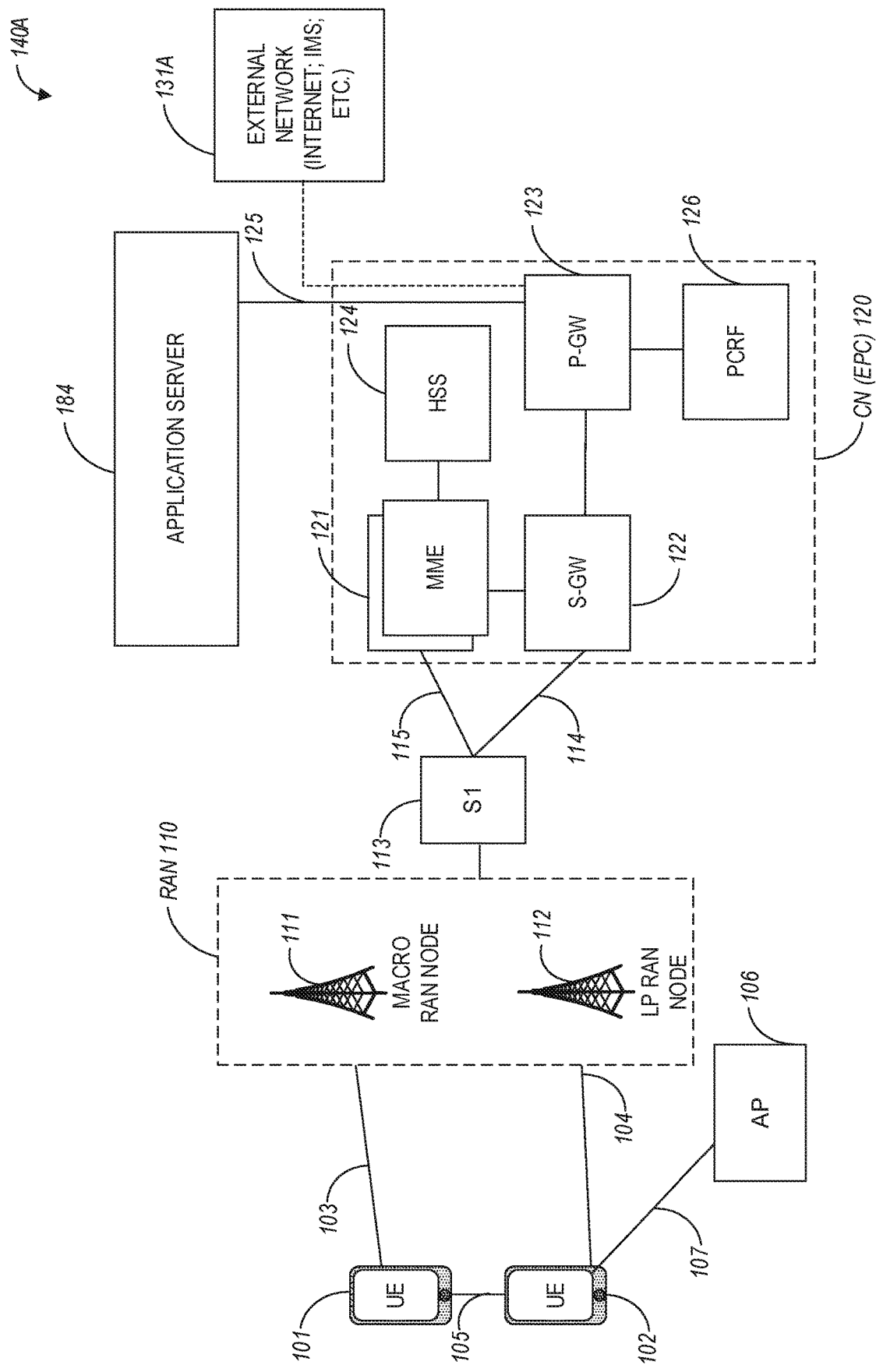
FIG. 1A illustrates an architecture of a network, in accordance with some aspects.

FIG. 1A illustrates an architecture of a network in accordance with some aspects. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UT, thus increasing the bandwidth available to a single device. In some aspects, carrier aggregation may be used where one or more component carriers operate on unlicensed frequencies.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies).

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1I). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including 5G new radio network using communications in the licensed (5G NR) and the unlicensed (5G NR-U) spectrum. One of the current enablers of IoT is the narrowband-IoT (NB-IoT).

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
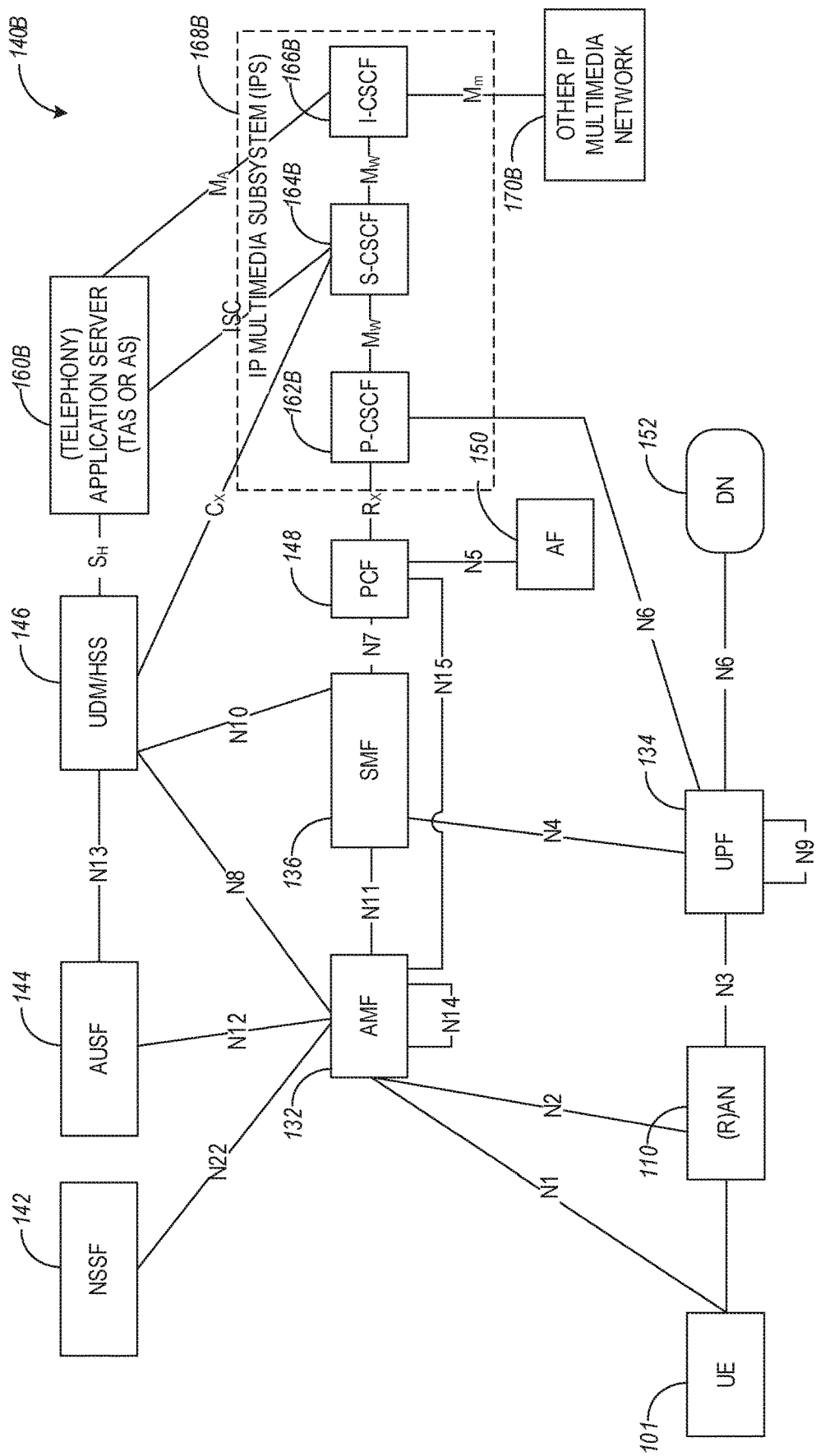
FIG. 1B and FIG. 1C illustrate a non-roaming 5G system architecture in accordance with some aspects.

FIG. 1B illustrates a non-roaming 5G system architecture in accordance with some aspects. Referring to FIG. 1B, there is illustrated a 5G system architecture 140B in a reference point representation. More specifically, UE 102 can be in communication with RAN 110 as well as one or more other 5G core (5GC) network entities. The 5G system architecture 140B includes a plurality of network functions (NFs), such as access and mobility management function (ANTE) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF M8 can be configured to provide a policy framework using network slicing, mobility management, and roaming (similar to PCRF in a 4G communication system). The UDM can be configured to store subscriber profiles and data (similar to an HSS in a 4G communication system).

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B, The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operators network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1E can also be used.

Figure 1C:
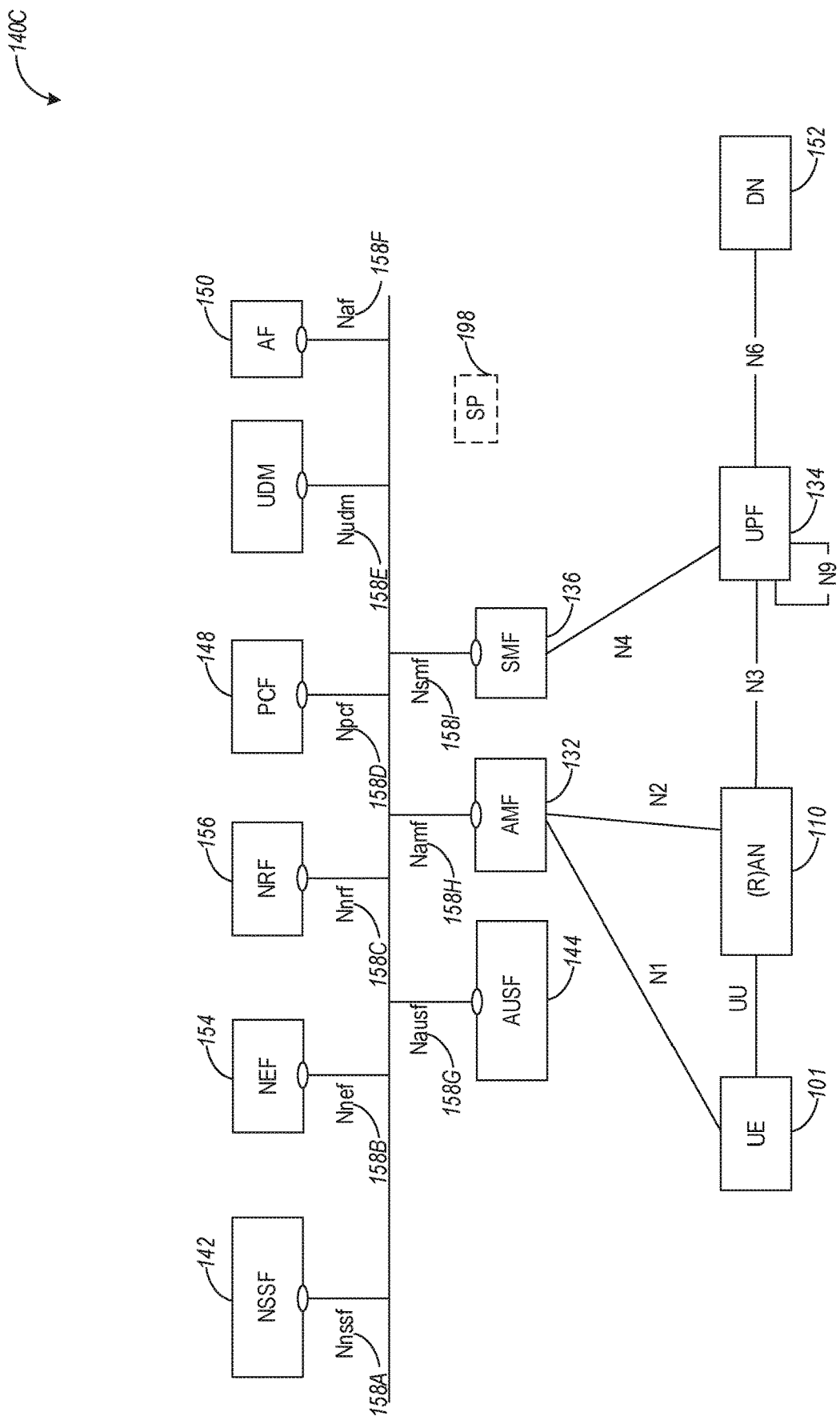

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

Techniques discussed herein can be performed by a UE or a base station (e.g., any of the UEs or base stations illustrated in connection with FIG. 1A-FIG. 1C).

In NR-U communications, a radio link monitoring (RLM) feature may be needed for enabling stand-alone operation. In some aspects, RLM is based on measurements of a predictable and periodically transmitted signal from the serving gNB. Due to LBT requirements, it may not be feasible to transmit a periodic signal for RLM in a predictable fashion.

Techniques discussed herein can be used to provide an indication of transmission failure (TXF) that is determined at the UE in layer 1 (L1) as well as UE reporting to the gNB indicating certain transmission occasions of an RLM-RS has been detected as TXF.

RLM procedure in a licensed spectrum operation with no LBT.

Figure 2:
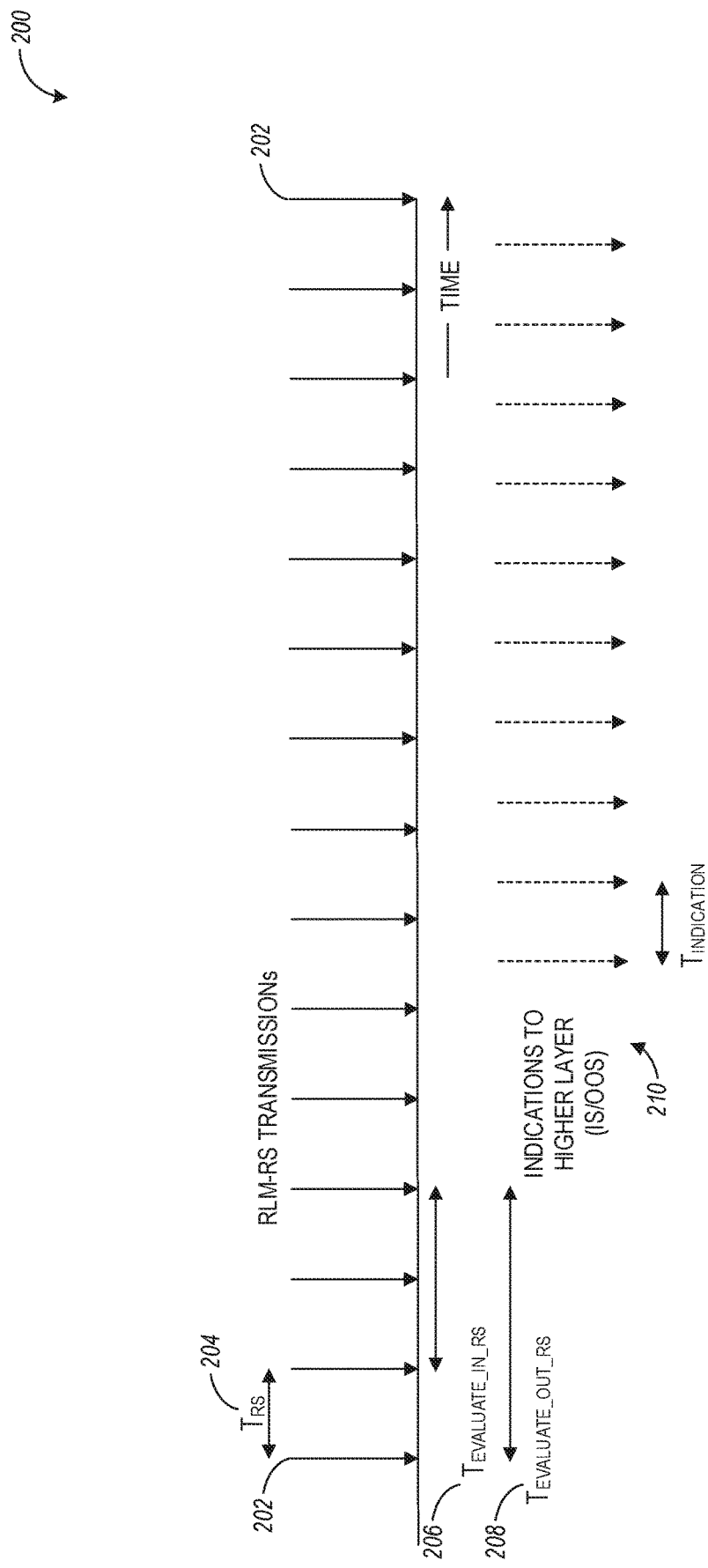
FIG. 2 illustrates radio link monitoring reference signal (RLM-RS) transmissions and various RLM-related parameters for communications within a licensed spectrum without listen-before-talk (LBT), in accordance with some aspects.

FIG. 2 illustrates RLM-RS transmissions 200 and various RLM-related parameters for communications within a licensed spectrum without listen-before-talk (LBT), in accordance with some aspects.

In some aspects associated with licensed spectrum operation, a gNB is able to perform transmission without any LBT requirements. A UE performs RLM procedure in RRC CONNECTED state based on measurements performed on an RLM-RS.

As illustrated in FIG. 2, an RLM-RS 202 is periodically transmitted with a certain periodicity $T_{RS}$ 204. The UE is aware of the RLM-RS configuration to be able to perform measurements on every transmission occasion of the RLM-RS within an evaluation window. The UE evaluates a hypothetical PDCCH block error rate (BLER) metric against an indicated threshold in L1. If the UE determines that the hypothetical PDCCH BLER is higher than a certain threshold (e.g., 10%), the UE may generate an out-of-sync (OOS) indication to the higher layer and/or to the base station. If the UE determines that the hypothetical PDCCH BLER is lower than a certain threshold (e.g., 2%), the UE may generate an in-sync (IS) indication to the higher layer and/or to the base station.

The evaluation window for OOS indication is governed by a certain time $T_{Evaluate\_out\_RS}$ 208 that captures a certain number of RLM-RS transmission occasions (3 shown in FIG. 2). The evaluation window for IS indication is governed by a certain time $T_{Evaluate\_in\_RS}$ 206 that captures a certain number of RLM-RS transmission occasions (2 shown in FIG. 2). Within the IS or OOS evaluation window, a UE may use implementation-specific algorithms for determining the BLER metric. For example, a UE may perform channel and interference measurements on all the transmission occasions of the RLM-RS, apply a hypothetical receiver model, apply filtering, determine SINR, determine mutual information, and predict a BLER based on the indicated hypothetical PDCCH configuration. A UE may also use additional information such as actual PDCCH decoding success during the evaluation window. Furthermore, an outcome of the evaluation (IS or OOS indication) may be indicated to the higher layer (and/or to the base station) at each interval of time $T_{indication}$ 210, as shown in FIG. 2. Upon reception of N310 number of consecutive OOS indications, the higher layer starts an RLF timer T310. Upon reception of N311 number of consecutive IS indications, the higher layer stops the T310 timer. Upon the expiry of the T310 timer, an RLF procedure is ordered by the higher layer. In some aspects, the thresholds mentioned herein, the time durations (e.g., 204, 206, 208), the timers T310 and T311, as well as the parameters N310 and N311 may be configured dynamically or by higher layers (e.g., via RRC signaling).

Three state indications for the RLM procedure for unlicensed spectrum operation (with LBT).

Figure 3:
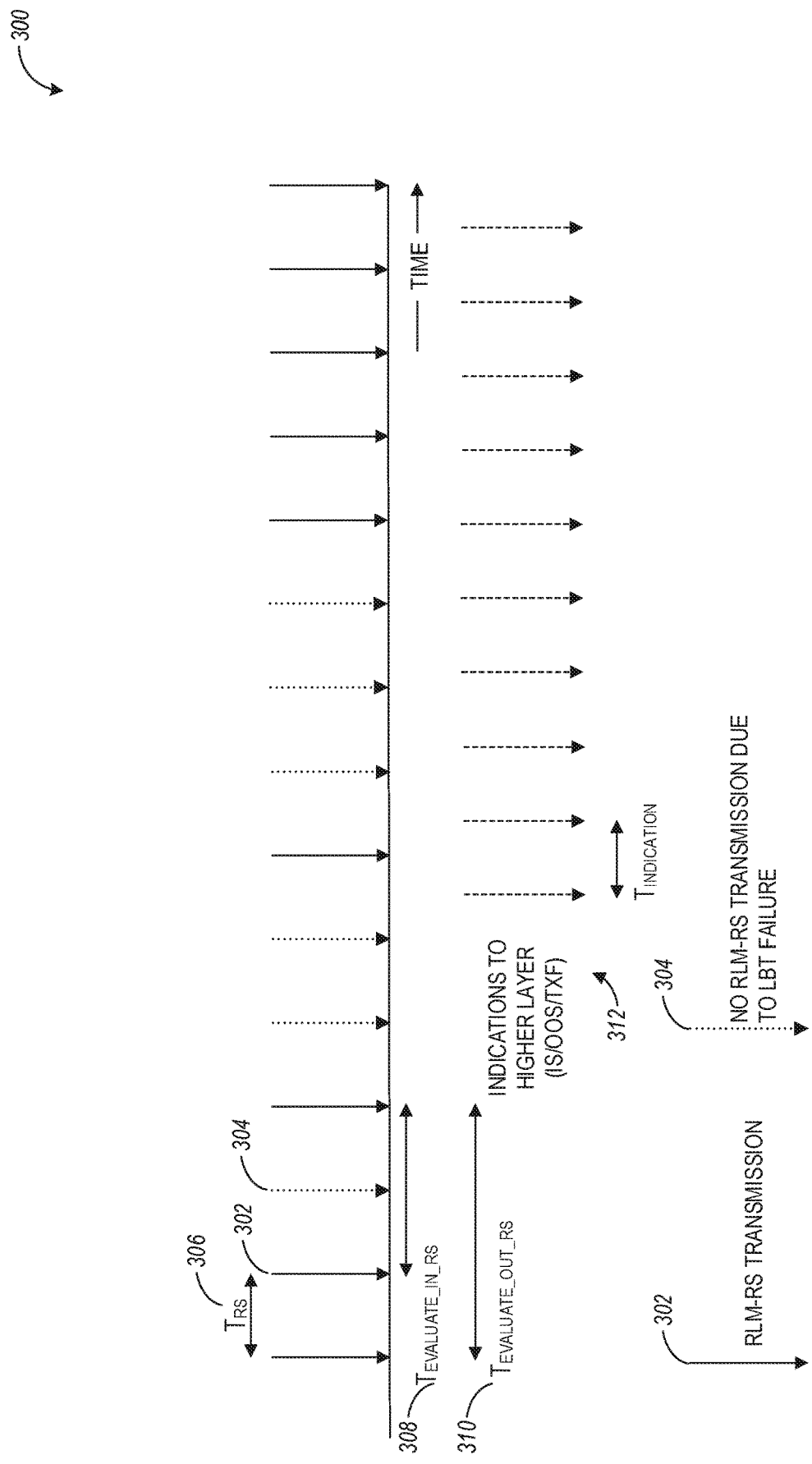
FIG. 3 illustrates RLM-RS transmissions and various RLM-related parameters for communications within an unlicensed spectrum where RLM-RS is subject to LBT, in accordance with some aspects.

FIG. 3 illustrates RLM-RS transmissions and various RLM-related parameters for communications within an unlicensed spectrum where RLM-RS is subject to LBT, in accordance with some aspects.

In some aspects associated with unlicensed spectrum operation, the RLM-RS transmissions 302 with periodicity 306 may be subject to LBT. For simplicity, it may be assumed that if LBT fails then RLM-RS is not transmitted for that transmission occasion (e.g., as indicated by reference 304 in FIG. 3, where RLM-RS is not transmitted for certain transmission occasions). If LBT succeeds, the RLM-RS is transmitted for that transmission occasion (e.g., as indicated by 302 in FIG. 3).

The main issue with respect to RLM is that dropped RLM-RS transmission occasions due to LBT failure may trigger RLF that is undesired. In this case, for an evaluation period (e.g., $T_{Evaluate\_out\_RS}$ 310 or $T_{Evaluate\_in\_RS}$ 308), a UE determines whether IS or OOS indication can be determined with sufficient confidence and accuracy. For example, if RLM-RS is defined as a synchronization signal (SS)/physical broadcast channel (PBCH) (SS/PBCH) block index, a UE may perform primary synchronization signal (PSS) and/or secondary synchronization signal (SSS) detection to determine successful RLM-RS transmission for a particular transmission occasion. A UE may also perform PBCH detection to determine successful RLM-RS transmission for a particular transmission occasion. If the number of successful PSS/SSS/PBCH detections within an evaluation period is 0 (or smaller than a threshold), then a UE may determine a third indication called Transmission Failure (TXF) indication (implying IS/OOS indication cannot be determined or cannot be determined with sufficient confidence and accuracy).

If the number of successful PSS/SSS/PBCH detections within an evaluation period is higher than another threshold (or is 100%), then the UE may proceed with determining IS/OOS indications 312 (e.g., as discussed in connection with FIG. 2). This is feasible because generally, the required SINR for OOS indication is much higher than the required SINR for PSS/SSS/PBCH detection and, therefore, a successful PSS/SSS/PBCH detection may not automatically imply an IS indication.

In some aspects, a preamble reference signal (preamble-RS) may be transmitted from the serving gNB indicating an acquired channel occupancy time (COT) length. A UE may use such a detected preamble-RS to assume that certain RLM-RS transmissions are not dropped due to LBT.

In summary, several implementation-specific options may be available for a UE to report a choice from three indicators—IS/OOS/TXF to the higher layers and/or to the base station. In some embodiments, $T_{Evaluate\_out\_RS}$ 310 may be used for evaluation of OOS and TXF, and $T_{Evaluate\_in\_RS}$ 308 may be used for evaluation of IS and TXF. Alternatively, a separate time interval $T_{Evaluate\_TXF\_RS}$ (not illustrated in FIG. 3) may configured and be used for evaluating TXF. In this case, $T_{Evaluate\_out\_RS}$ may be used for evaluation of OOS, $T_{Evaluate\_in\_RS}$ is used for evaluation of IS, and $T_{Evaluate\_TXF\_RS}$ may be used for evaluating TXF. Upon reception of N312 number of consecutive TXF indications, the higher layer may start an RLF timer T310. Upon reception of N311 number of consecutive IS indications (without any TXF indication), or N311+Δ number of consecutive IS-indications (in case there are δ number of TXF indications received in between, where Δ and δ can be pre-configured or configured by higher layer depending on load condition etc.), or a combinations thereof, the higher layer stops the T310 timer. Upon expiry of T310 timer, an RLF procedure is ordered by the higher layer. In some aspects, the thresholds mentioned herein, the time period durations (e.g., 306, 308, 310), the timers T310 and T311, as well as the parameters N310, N311, Δ, and δ may be configured dynamically or by higher layers (e.g., via RRC signaling).

UE reporting for RLM procedure during unlicensed spectrum operation (with LBT).

The capability of a UE to determine TXF with reasonable accuracy may be used for distinguishing poor link quality (OOS) from transmission failure (due to LBT) in certain cases and can be beneficial to limit false RLF triggers by the UE. In order to test this LIE capability, a reporting mechanism may be beneficial. A report can also be beneficial for the gNB to judge the accuracy of TXF prediction by a UE in a certain environment (since a gNB is aware of the dropped RLM-RS transmission occasions). For example, based on the report, a gNB can set or adjust the UE specific RLM parameters appropriately.

Figure 4:
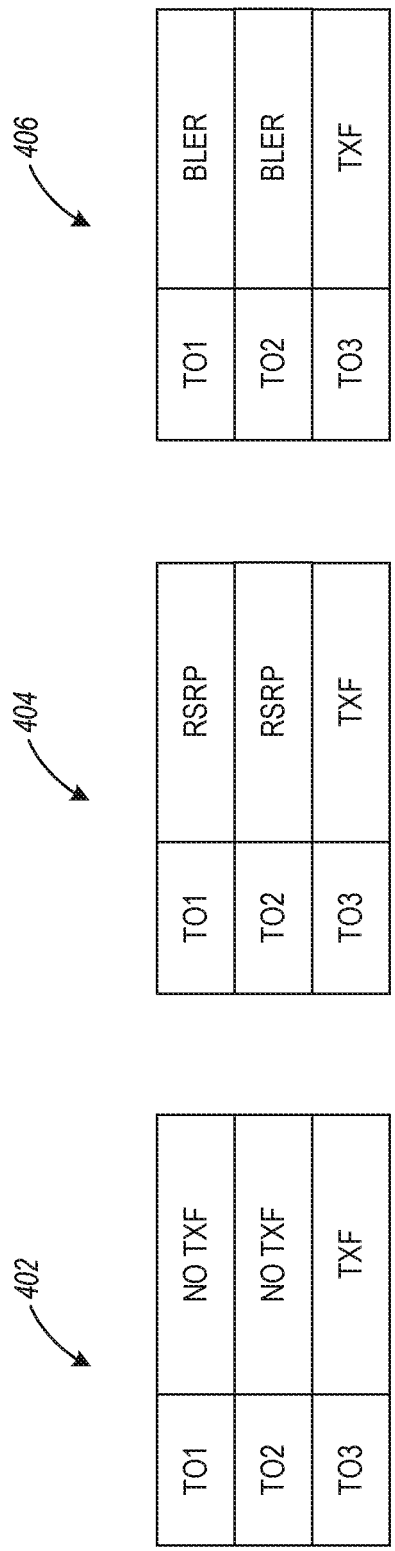
FIG. 4 illustrates UE reporting options of a detected transmission failure (TXF) occasions of RLM-RS, in accordance with some aspects.

FIG. 4 illustrates UE reporting options of a detected transmission failure (TXF) occasions of RLM-RS, in accordance with some aspects. As an example, a UE may report on TXF determination for a certain $T_{Evaluate\_TXF\_RS}$ measurement duration. Assuming three transmission occasions (TO1, TO2, and TO3) of RLM-RS within a measurement duration $T_{Evaluate\_TXF\_RS}$, a UE may generate reports 402, 404, and 406 for multiple measurement durations with reporting information such as TXF, no-TXF, reference signal received power (RSRP), or BLER for the corresponding transmission occasions.

Figure 5:
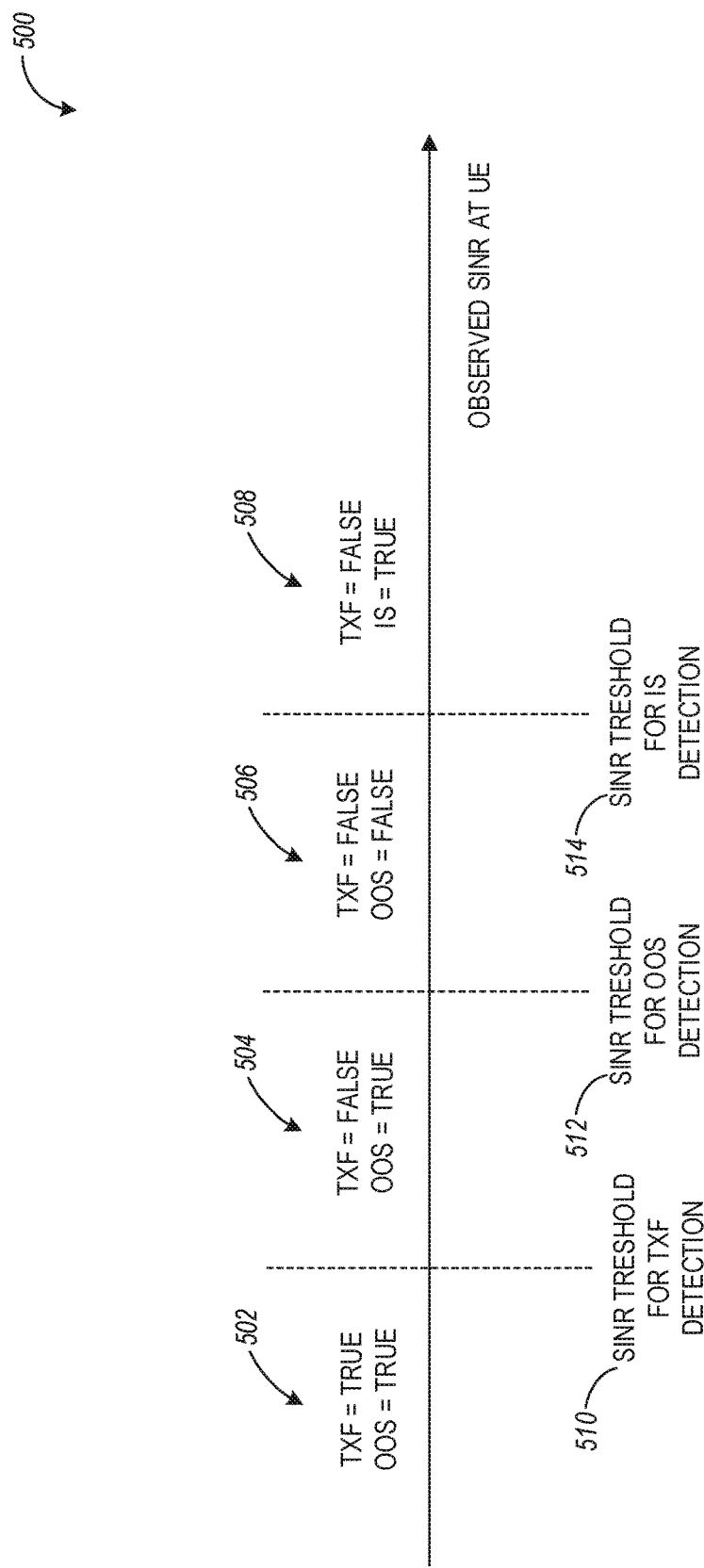
FIG. 5 illustrates a signal-to-interference-plus-noise ratio (SINR) range where detection of TXF is beneficial in order to not trigger falls radio link failure (RLF), in accordance with some aspects.

FIG. 5 illustrates a signal-to-interference-plus-noise ratio (SINR) range where detection of TXF is beneficial in order to not trigger falls radio link failure (RLF), in accordance with some aspects. Referring to FIG. 5, diagram 500 illustrates SINR ranges 502, 504, 506, and 508. SINR range 502 can be associated with observed SINR from zero to SINR threshold 510. In SINR range 502, both TXF and OOS indicators can be true.

SINR range 504 can be associated with observed SINR from SINR threshold 510 to SINR threshold 512. In SINR range 504, the TXF indicator is false and the OOS indicator is true.

SINR range 506 can be associated with observed SINR from SINR threshold 512 to SINR threshold 514. In SINR range 506, the TXF indicator is false and the OOS indicator is false.

SINR range 508 can be associated with observed SINR above the SINR threshold 514. In SINR range 508, the TXF indicator is false and the IS indicator is true.

Figure 6:
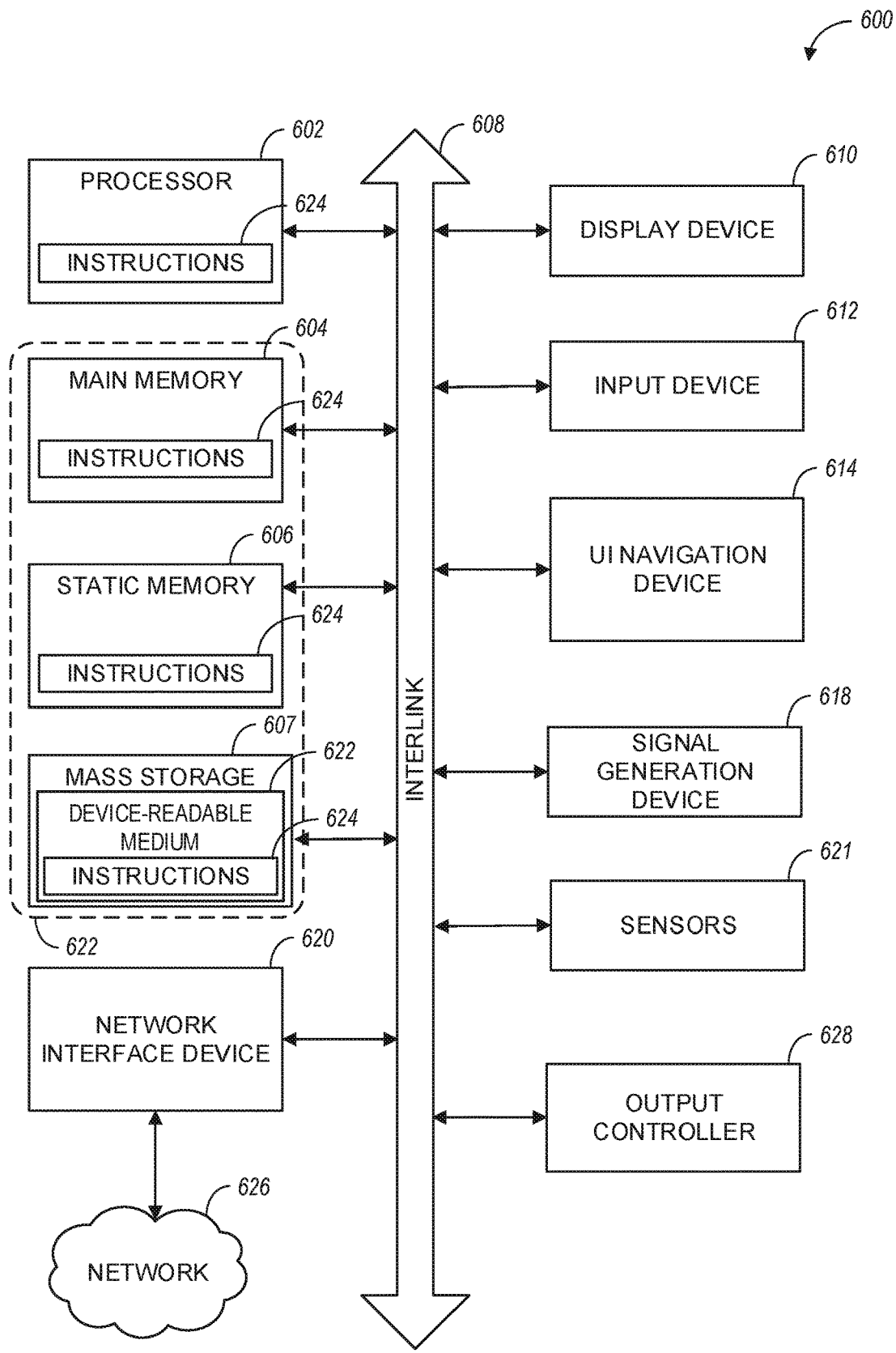
FIG. 6 illustrates a block diagram of a communication device such as an evolved. Node-B (eNB), a new generation Node-B (gNB), an access point (AP), a wireless station (STA), a mobile station (MS), or a user equipment (UE), in accordance with some aspects.

FIG. 6 illustrates a block diagram of a communication device such as an evolved Node-B (eNB), a next generation Node-B (gNB), an access point (AP), a wireless station (STA), a mobile station (MS), or a user equipment (UE), in accordance with some aspects and to perform one or more of the techniques disclosed herein. In alternative aspects, the communication device 600 may operate as a standalone device or may be connected (e.g., networked) to other communication devices.

Circuitry (e.g., processing circuitry) is a collection of circuits implemented in tangible entities of the device 600 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. For example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 600 follow.

In some aspects, the device 600 may operate as a standalone device or may be connected (e.g., networked) to other devices. In a networked deployment, the communication device 600 may operate in the capacity of a server communication device, a client communication device, or both in server-client network environments. In an example, the communication device 600 may act as a peer communication device in peer-to-peer (P2P) (or other distributed) network environment. The communication device 600 may be a eNB, PC, a tablet PC, a STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. For example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using the software, the general-purpose hardware processor may be configured as respective different modules at different times. The software may accordingly configure a hardware processor, for example, to constitute a particular module at one instance of time and to constitute a different module at a different instance of time.

Communication device (e.g., UE) 600 may include a hardware processor 602 (e.g., a central processing unit (CPU), a graphics processing unit (GPU), a hardware processor core, or any combination thereof), a main memory 604, a static memory 606, and mass storage 607 (e.g., hard drive, tape drive, flash storage, or other block or storage devices), some or all of which may communicate with each other via an interlink (e.g., bus) 608.

The communication device 600 may further include a display device 610, an alphanumeric input device 612 (e.g., a keyboard), and a user interface (UI) navigation device 614 (e.g., a mouse). In an example, the display device 610, input device 612 and UI navigation device 614 may be a touchscreen display. The communication device 600 may additionally include a signal generation device 618 (e.g., a speaker), a network interface device 620, and one or more sensors 621, such as a global positioning system (GPS) sensor, compass, accelerometer, or another sensor. The communication device 600 may include an output controller 628, such as a serial (e.g., universal serial bus (USB), parallel, or other wired or wireless (e.g., infrared (IR), near field communication (NEC), etc.) connection to communicate or control one or more peripheral devices (e.g., a printer, card reader, etc.).

The storage device 607 may include a communication device-readable medium 622, on which is stored one or more sets of data structures or instructions 624 (e.g., software) embodying or utilized by any one or more of the techniques or functions described herein. In some aspects, registers of the processor 602, the main memory 604, the static memory 606, and/or the mass storage 607 may be, or include (completely or at least partially), the device-readable medium 622, on which is stored the one or more sets of data structures or instructions 624, embodying or utilized by any one or more of the techniques or functions described herein. In an example, one or any combination of the hardware processor 602, the main memory 604, the static memory 606, or the mass storage 616 may constitute the device-readable medium 622.

As used herein, the term "device-readable medium" is interchangeable with "computer-readable medium" or "machine-readable medium". While the communication device-readable medium 622 is illustrated as a single medium, the term "communication device-readable medium" may include a single medium or multiple media (e.g., a centralized or distributed database, and/or associated caches and servers) configured to store the one or more instructions 624. The term "communication device-readable medium" is inclusive of the terms "machine-readable medium" or "computer-readable medium", and may include any medium that is capable of storing, encoding, or carrying instructions (e.g., instructions 624) for execution by the communication device 600 and that cause the communication device 600 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 624 may further be transmitted or received over a communications network 626 using a transmission medium via the network interface device 620 utilizing any one of a number of transfer protocols. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input-multiple-output (SIMO), MIMO, or multiple-input-single-output (MISO) techniques. In some examples, the network interface device 620 may wirelessly communicate using Multiple User MIMO techniques.

The term "transmission medium" shall be taken to include any intangible medium that is capable of storing, encoding or carrying instructions for execution by the communication device 600, and includes digital or analog communications signals or another intangible medium to facilitate communication of such software. In this regard, a transmission medium in the context of this disclosure is a device-readable medium.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. This Detailed Description, therefore, is not to be taken in a limiting sense, and the scope of various aspects is defined only by the appended claims, along with the full range of equivalents to which such claims are entitled.

What is claimed is:

1. An apparatus of a user equipment (UE), the apparatus comprising:
   processing circuitry, wherein to configure the UE for radio link monitoring (RLM) in a New Radio-Unlicensed (NR-U) network, the processing circuitry is to:
      decode radio resource control (RRC) signaling from a base station, the RRC signaling including configuration information to configure one or more transmission occasions for a plurality of RLM reference signals (RLM-RSs);
      perform a primary synchronization signal (PSS) or a secondary synchronization signal (SSS) or a physical broadcast channel (PBCH) detection to determine a number of first RLM-RSs of the plurality of RLM-RSs that are successfully transmitted during the transmission occasions within an evaluation duration;
      perform signal measurements on the first RLM-RSs that are successfully transmitted within the evaluation duration to determine a hypothetical block error rate (BLER) for physical downlink control channel (PDCCH) reception, the signal measurements performed during the transmission occasions within the evaluation duration; and
      generate based on the signal measurements, one of an in-sync (IS) indicator or an out-of-sync (OOS) indicator for communication to a higher layer;
      generate a transmission failure (TXT) indicator when the number of first RLM-RSs of the plurality of RLM-RSs that are successfully transmitted during the transmission occasions within the evaluation duration is zero or is smaller than a threshold number, the threshold number configured by higher layer signaling; and
   memory coupled to the processing circuitry and configured to store the signal measurements.

2. The apparatus of claim 1, wherein the processing circuitry is to:
   upon generating a total of N312 number of consecutive TXF indicators including the TXF indicator, start a radio link failure (RLF) timer T310,
   wherein N312 and the T310 timer are configured by higher layer signaling.

3. The apparatus of claim 2, wherein the processing circuitry is to:
   initiate an RLF procedure upon expiration of the RLF timer T310.

4. The apparatus of claim 2, wherein the processing circuitry is to:
   upon generating a total of N311 number of consecutive IS indicators without a TXF indicator, stopping the RLF timer T310.

5. The apparatus of claim 1, wherein the evaluation duration comprises a first pre-configured time duration, and wherein the processing circuitry is to:
   when the number is higher than the threshold number, perform an evaluation on the BLER for a subset of the RLM-RSs that are successfully transmitted within the first pre-configured time duration within the transmission occasions; and
   generate the OOS indicator when the BLER for a number of RLM-RSs of the plurality of RLM-RSs that are successfully transmitted within the first pre-configured time duration is higher than an OOS threshold.

6. The apparatus of claim 5, wherein the evaluation duration comprises a second pre-configured time duration, and wherein the processing circuitry is to:
   when the number is higher than the threshold number, perform an evaluation on the BLER for a subset of the RLM-RSs that are successfully transmitted within the second pre-configured time duration within the transmission occasions; and
   generate the IS indicator when the BLER for the number of RLM-RSs of the plurality of RLM-RSs that are successfully transmitted within the second pre-configured time duration is lower than an IS threshold.

7. The apparatus of claim 6, wherein the threshold number, the OOS threshold, and the IS threshold are configured by the RRC signaling.

8. The apparatus of claim 1, wherein the processing circuitry is to:
   perform a physical broadcast channel (PBCH) detection to determine the number of RLM-RSs of the plurality of RLM-RSs that are successfully transmitted during the transmission occasions.

9. The apparatus of claim 1, wherein the processing circuitry is to:
   for each transmission occasion within the evaluation duration, encode for transmission to the base station at least one of the following: the TXF indicator, an indicator of absence of a TXF during the transmission occasion, and a reference signal received power (RSRP) associated with an RLM-RS of the plurality of RLM-RSs received during the transmission occasion.

10. The apparatus of claim 1, further comprising transceiver circuitry coupled to the processing circuitry; and, one or more antennas coupled to the transceiver circuitry.

11. A computer-readable non-transitory storage medium that stores instructions for execution by one or more processors of a user equipment (UE), the instructions to configure the UE for radio link monitoring (RLM) in a New Radio-Unlicensed (NR-U) network, and to cause the UE to:
   decode radio resource control (RRC) signaling from a base station, the RRC signaling including configuration information to configure transmission occasions for a plurality of RLM reference signals (RLM-RSs);
   perform a primary synchronization signal (PSS) or a secondary synchronization signal (SSS) detection to determine a number of first RLM-RSs of the plurality of RLM-RSs that are successfully transmitted during the transmission occasions within an evaluation duration;
   perform signal measurements on the first RLM-RSs that are successfully transmitted within the evaluation duration to determine a hypothetical block error rate (BLER) for physical downlink control channel (PDCCH) reception, the signal measurements performed when the number is higher than a threshold number;

generate a transmission failure (TXT) indicator when the number of first RLM-RSs of the plurality of RLM-RSs that are successfully transmitted during the transmission occasions within the evaluation duration is zero or is smaller than a threshold number, the threshold number configured by higher layer signaling; and generate based on the signal measurements, one of an in-sync (IS) indicator or an out-of-sync (OOS) indicator for communication to a higher layer.

12. The computer-readable non-transitory storage medium of claim 11, wherein the instructions further cause the UE to:

upon generating a total of N312 number of consecutive TXF indicators including the TXF indicator, start a radio link failure (RLF) timer T310; and initiate an RLF procedure upon expiration of the RLF timer T310, wherein N312 and the T310 timer are configured by higher layer signaling.

13. The computer-readable non-transitory storage medium of claim 12, wherein the instructions further cause the UE to:

upon generating a total of N311 number of consecutive IS indicators without a TXF indicator, stopping the RLF timer T310.

14. The computer-readable non-transitory storage medium of claim 11, wherein the evaluation duration comprises a first pre-configured time duration, and wherein the instructions further cause the UE to:

when the number is higher than the threshold number, perform an evaluation on the BLER for a subset of the RLM-RSs that are successfully transmitted within the first pre-configured time duration within the transmission occasions; and generate the OOS indicator when the BLER for a number of RLM-RSs of the plurality of RLM-RSs that are successfully transmitted within the first pre-configured time duration is higher than an OOS threshold.

15. The computer-readable non-transitory storage medium of claim 14, wherein the evaluation duration comprises a second pre-configured time duration, and wherein the instructions further cause the UE to:

when the number is higher than the threshold number, perform an evaluation on the BLER for a subset of the RLM-RSs that are successfully transmitted within the second pre-configured time duration within the transmission occasions; and generate the IS indicator when the BLER for the number of RLM-RSs of the plurality of RLM-RSs that are successfully transmitted within the second pre-configured time duration is lower than an IS threshold.

16. The computer-readable non-transitory storage medium of claim 11, wherein the instructions further cause the UE to:

perform a physical broadcast channel (PBCH) detection to determine the number of RLM-RSs of the plurality of RLM-RSs that are successfully transmitted during the transmission occasions.

17. A method, comprising:

by a user equipment (UE):

wherein to configure the UE for radio link monitoring (RLM) in a New Radio-Unlicensed (NR-U) network, the processing circuitry is to:

decoding radio resource control (RRC) signaling from a base station, the RRC signaling including configuration information to configure one or more transmission occasions for a plurality of RLM reference signals (RLM-RSs);

performing a primary synchronization signal (PSS) or a secondary synchronization signal (SSS) or a physical broadcast channel (PBCH) detection to determine a number of first RLM-RSs of the plurality of RLM-RSs that are successfully transmitted during the transmission occasions within an evaluation duration;

performing signal measurements on the first RLM-RSs that are successfully transmitted within the evaluation duration to determine a hypothetical block error rate (BLER) for physical downlink control channel (PDCCH) reception, the signal measurements performed during the transmission occasions within the evaluation duration; and generating based on the signal measurements, one of an in-sync (IS) indicator or an out-of-sync (OOS) indicator for communication to a higher layer;

generating a transmission failure (TXT) indicator when the number of first RLM-RSs of the plurality of RLM-RSs that are successfully transmitted during the transmission occasions within the evaluation duration is zero or is smaller than a threshold number, the threshold number configured by higher layer signaling; and storing the signal measurements in a non-transitory computer-readable storage medium.

18. The method of claim 17, further comprising:

upon generating a total of N312 number of consecutive TXF indicators including the TXF indicator, starting a radio link failure (RLF) timer T310, wherein N312 and the T310 timer are configured by higher layer signaling.

19. The method of claim 18, further comprising:

initiating an RLF procedure upon expiration of the RLF timer T310.

20. The method of claim 18, further comprising:

upon generating a total of N311 number of consecutive IS indicators without a TXF indicator, stopping the RLF timer T310.

* * * * *